(12) United States Patent
Opstad et al.

(10) Patent No.: US 7,692,656 B2
(45) Date of Patent: Apr. 6, 2010

(54) AUTOMATIC SYNTHESIS OF FONT TABLES FOR CHARACTER LAYOUT

(75) Inventors: David G. Opstad, Mountain View, CA (US); Alexander B. Beaman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 11/455,885

(22) Filed: Jun. 20, 2006

(65) Prior Publication Data

US 2006/0232588 A1    Oct. 19, 2006

Related U.S. Application Data

(62) Division of application No. 09/306,888, filed on May 7, 1999, now Pat. No. 7,064,757.

(51) Int. Cl.
*G06T 11/00* (2006.01)
(52) U.S. Cl. ........................................ 345/467; 345/469
(58) Field of Classification Search ................. 345/467, 345/469
See application file for complete search history.

(56) References Cited

U.S. PATENT DOCUMENTS

| | | | |
|---|---|---|---|
| 5,001,697 A | 3/1991 | Torres | |
| 5,167,016 A | 11/1992 | Bagley et al. | |
| 5,416,898 A | 5/1995 | Opstad et al. | |
| 5,495,577 A | 2/1996 | Davis et al. | |
| 5,500,931 A * | 3/1996 | Sonnenschein | 715/234 |
| 5,513,278 A | 4/1996 | Hashizume et al. | |
| 5,592,594 A | 1/1997 | Cahoon | |
| 5,664,086 A | 9/1997 | Brock et al. | |
| 5,675,718 A | 10/1997 | Miller | |
| 5,710,880 A | 1/1998 | Howlett et al. | |
| 5,778,361 A | 7/1998 | Nanjo et al. | |
| 5,778,383 A | 7/1998 | Grisar | |
| 5,870,084 A * | 2/1999 | Kanungo et al. | 345/551 |
| 5,926,189 A * | 7/1999 | Beaman et al. | 345/467 |
| 5,959,634 A | 9/1999 | Yoshida | |
| 6,043,826 A * | 3/2000 | Manning | 345/467 |
| 6,091,505 A * | 7/2000 | Beaman et al. | 358/1.11 |
| 6,236,390 B1 | 5/2001 | Hitchcock | |
| 6,253,374 B1 | 6/2001 | Dresevic et al. | |
| 6,288,726 B1 | 9/2001 | Ballard | |
| 6,421,055 B1 | 7/2002 | Jones et al. | |
| 6,426,751 B1 * | 7/2002 | Patel et al. | 345/468 |
| 6,714,199 B1 | 3/2004 | Beaman et al. | |

\* cited by examiner

*Primary Examiner*—Michelle K Lay
(74) *Attorney, Agent, or Firm*—Buchanan Ingersoll & Rooney PC (57) ABSTRACT

Data tables that are required for the proper processing of font glyphs are automatically synthesized if they do not form part of an original font definition. The synthesized tables are stored in an annex file that is associated with the font, rather than being incorporated into the font definition. As a result, the integrity of the original font data is maintained, and does not adversely affect font protection systems that are based upon font data.

10 Claims, 5 Drawing Sheets

AUTOMATIC SYNTHESIS OF FONT TABLES FOR CHARACTER LAYOUT

This application is a divisional of U.S. patent application Ser. No. 09/306,888, filed May 7,1999, now U.S. Pat. No. 7,064,757, which is herein incorporated by reference.

FIELD OF THE INVENTION

The present invention relates to the display and printing of font characters, and more particularly to a method and system for automatically synthesizing font tables that determine the manner in which images of characters are processed for printing and display.

BACKGROUND OF THE INVENTION

The continued evolution of application programs, such as word processing and desktop publishing programs, has provided users with a great deal of versatility and control in the appearance of documents created with these types of programs. A significant factor in this area is the ability to influence the layout of textual and symbolic characters on a page. Initially, the character fonts that were available for use in these types of programs were relatively static, in the sense that their shapes and positioning were rigidly fixed according to a predefined set of rules. As new fonts have been developed, the technology pertaining to the appearance and layout of characters has also evolved, so that new capabilities are continuously being added to fonts. As a result, it is now possible to control a number of different parameters which determine the appearance and layout of characters in a line of text. Examples of these parameters include the identification of the specific glyphs that define the appearances of the characters, substitution of contextual letterforms and ligatures, the positioning of the glyphs relative to one another, hanging punctuation, and optical alignment of a line of characters.

To provide these types of capabilities, a given font is comprised of more than just the glyphs which determine the appearances of the individual characters. In particular, the font definition consists of a number of data tables that relate to various parameters which control the implementation of the font. For instance, a TrueType font comprises a file that may contain up to thirty or more tables that determine the layout and other characteristics of the font. Examples of the types of data in these tables include kerning, i.e. spacing between characters, the metrics or dimensions of glyphs, variable properties such as line widths, and the like. The information provided by these tables is employed for a number of different purposes. For instance, some processes may rely upon a table of the names of various font styles, to display in a menu or dialog box. Another use of the tables occurs when a line of characters is to be laid out for display or printing purposes. One example of a technology which lays out a line of text pursuant to the data in such tables is described in U.S. Pat. No. 5,416,898, the disclosure of which is incorporated herein by reference.

As font technology continues to evolve over time, new capabilities are constantly being added, to enhance the versatility and control over the appearance of characters. The added capabilities are generally accompanied by new data tables. An unfortunate consequence of this development is the fact that older fonts may not contain all of the tables necessary to conform to the latest capabilities. As an example, if an attempt is made to employ an older font which does not contain the latest tables, during the operation of a line layout processor that makes use of the newer tables, the results can range from an unaesthetic appearance to linguistically incorrect text.

In an effort to overcome the limitations associated with the use of older fonts, various tools have been made available to permit font developers to add new tables to existing fonts. However, there may be a reluctance by developers to alter the contents of a font once it has been accepted. Furthermore, even if a font is updated to incorporate the newer data tables, users must become aware of, and acquire, the updated fonts before they can be successfully used with the newer font processing technologies.

Accordingly, it is desirable to provide a mechanism via which data tables that are needed to properly process the glyphs of a font can be automatically synthesized if they are not part of the original font definition. Further in this regard, it is desirable to be able to synthesize and employ such tables in a manner which does not affect the original definition of the font.

SUMMARY OF THE INVENTION

In accordance with the present invention, these objectives are achieved by means of a method and system in which one or more font tables are automatically synthesized as needed, and placed in an annex file that is associated with the original font. When a character or string of text is requested by an application program, for example, a computer's font system first checks the original definition of the font, to see if it contains the tables that are necessary to display or print the requested characters. If the font itself does not contain the tables, the font system examines an associated annex file to see if the appropriate tables exist. If so, the table is accessed and its data is employed to process font data. If the table does not exist, it is automatically synthesized and placed in the annex, where its data is then utilized.

Using an annex file that is associated with a font, rather than physically adding the tables to the fonts themselves, provides several advantages. In particular, the actual font data is not affected by the creation of the new table. Consequently, font management systems that employ font protection, for example by performing checksums or calculating digital signatures for font data, will continue to operate properly. Furthermore, since the annex file is persistent and survives across successive boots of the computer, the effort required to synthesize a table is only expended once per font, and thereafter available for all subsequent uses of the font.

In one embodiment, the synthesis of a table is carried out by first creating a font map. The font map is constructed by analyzing a glyph repertoire associated with the font, to identify certain types of data associated with each glyph. The data in the font map is then used to compute tables which identify specific types of mappings between glyphs, or other characteristics associated with individual glyphs. These tables are stored in the annex, and their data is employed for various font processing techniques. In another embodiment, a table is created by reformatting and/or translating data that is already present in a font, to place it in a structure that can be used by a particular process.

The foregoing features of the invention, and the advantages provided thereby, are explained in greater detail hereinafter with reference to specific embodiments illustrated in the accompanying drawings.

DETAILED DESCRIPTION

To facilitate an understanding of the present invention, it is described hereinafter in the context of a specific implementation thereof. In particular, reference is occasionally made to features of the invention that are employed in connection with TrueType fonts, as well as line layout technology that is intended to be used with this type of font. It will be appreciated, however, that the practical applications of the invention are not limited to this particular example. For instance, the following embodiments have been demonstrated to work with PostScript fonts as well. Likewise, the data tables that are synthesized need not be only those which are used for line layout. The principles which underlie the invention can be utilized in connection with a number of different types of font technologies and font handling systems in which it is useful to employ font tables that determine the characteristics of a font.

Figure 1:
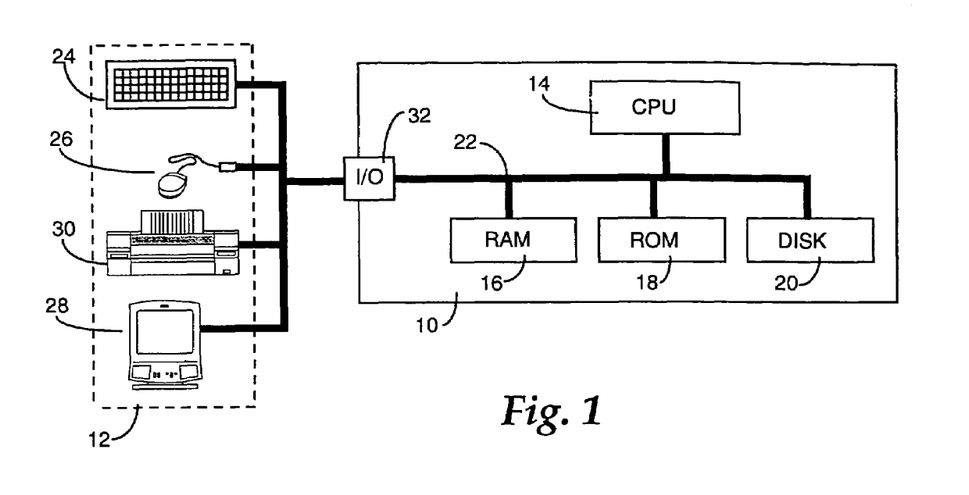
FIG. 1 is a general block diagram of the components of an exemplary computer system.

The present invention is broadly directed to the generation of character images in a computer, for display on a display device, such as a monitor, and/or printing in a document. While the particular hardware components of a computer system do not form a part of the invention itself, they are briefly described herein to provide a thorough understanding of the manner in which the features of the invention cooperate with the components of a computer system to produce desired results. Referring to FIG. 1, a typical computer system includes a computer 10 having a variety of peripheral devices 12 connected thereto. The computer 10 includes a central processing unit 14 and associated memory. This memory generally includes a main working memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or a LCD screen, provides a visual display of the information that is being processed within the computer, for example the contents of a document or a computer generated image. A tangible copy of this information can be provided through a printer 30, or similar such device. Each of these external peripheral devices communicates with the CPU 14 by means of one or more input/output ports 32 on the computer.

As further background to the concepts which underlie the present invention, one process which makes use of data tables synthesized in accordance with the invention, namely the generation and laying out of images of characters and symbols, will first be described. The general architecture of software programs that are loaded into the RAM 16 and executed on the computer is illustrated in the block diagram of FIG. 2. In a typical situation, the user interacts with one or more application programs 34, such as a word processing program, a desktop publishing program, or a graphics program. In operation, as the user types words via the keyboard 24, the application program issues requests to the computer's operating system 36 to have the characters corresponding to the keystrokes drawn on the display 28. Similarly, when the user enters a command to print a document, the application program issues requests to the operating system which cause the corresponding characters to be printed via the printer 30. For illustrative purposes, the following description of the operation of the present invention will be provided for the example in which characters are drawn on the screen of the display 28 in response to user-entered keystrokes. It will be appreciated, however, that similar operations are carried out in connection with the printing of characters in a document on the printer 30.

Figure 2:
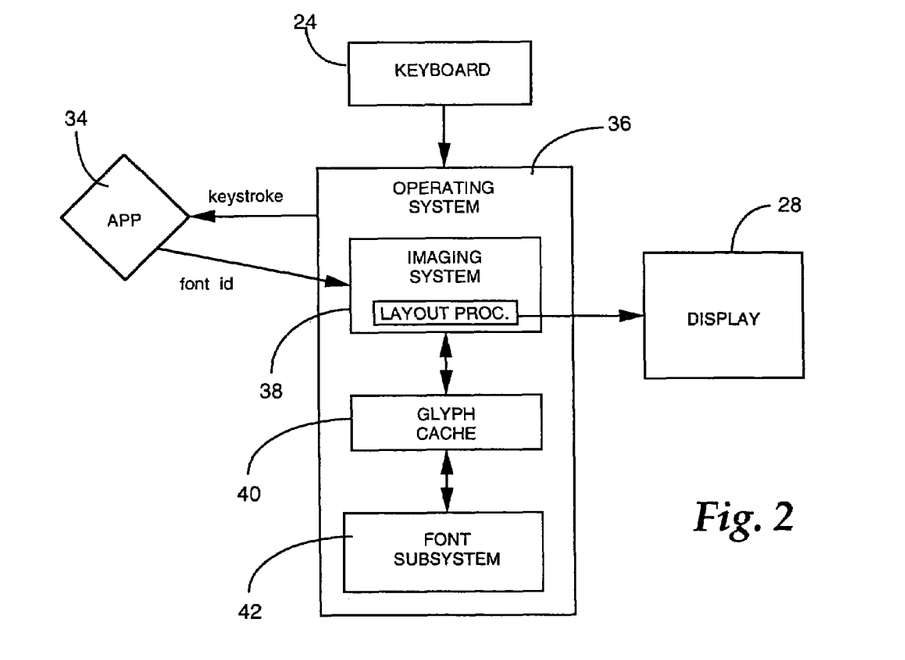
FIG. 2 is a block diagram illustrating the general architecture of software components involved in the implementation of the present invention.

When a user types a character via the keyboard 24, an indication of that event is provided to the application program 34 by the computer's operating system 36. In response, the application program issues a call to the computer's imaging system 38, to draw the character corresponding to the keystroke at a particular location on the display. That call includes a character code that designates a particular letter or other item of text, and style information which contains an identification of the font for the corresponding character. The imaging system 38 is a component of the computer's operating system 36. In the case of the Macintosh operating system, for example, the imaging system could be QuickDraw or QuickDraw GX.

Upon receipt of the request for a character in a particular font, the imaging system accesses a glyph cache 40, which contains bitmap images of characters. If the requested character has been previously displayed in the designated style, its image will be stored in the glyph cache, and immediately provided to the imaging system. If, however, the requested character is not stored in the cache, a call is made to a font subsystem 42, to obtain the requested image. The call to the font subsystem identifies a particular font object, a point size, a resolution and any possible variations.

Figure 3:
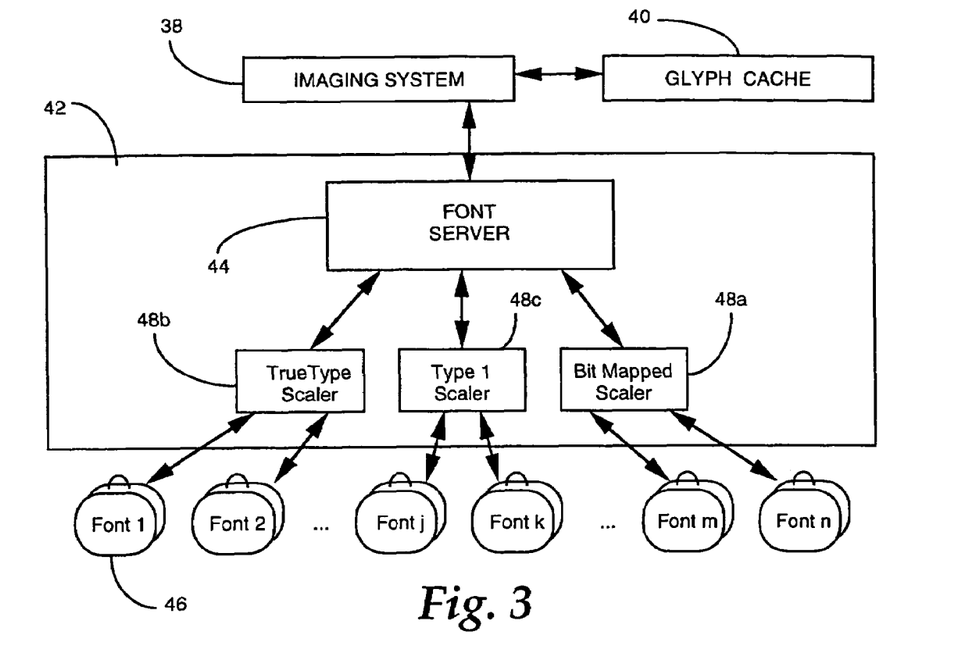
FIG. 3 is a more detailed view of the architecture of the font subsystem.

The structure of the font subsystem is illustrated in FIG. 3. Within the font subsystem 42, the management of requested font objects is handled by a font server 44. In general, when a request for a font is received from an application program, for instance via the imaging system 38, the font server is responsible for locating the font or, if it is not available, the best substitute for it. The font server also retrieves the fonts that have been requested, and supplies them to the imaging system. The font server may also be responsible for displaying a font selection dialog box from which the user can choose a desired font, and/or providing a list of available fonts to the application program, to be displayed in a font menu.

Each font that is stored in the computer, for example on the hard disk 20, resides in a file that is sometimes referred to as a suitcase. FIG. 3 illustrates a number of suitcases 46 that respectively store fonts labeled 1 through n. Each suitcase contains all of the data tables and other associated information that forms the definition of a font.

Fonts can be classified according to different technologies. Two well-known and widely used font technologies are TrueType and Type 1. These types of fonts are known as outline fonts, since their typeface designs, or glyphs, are specified by vectors which define the outlines of their shapes. Other types of fonts might fall into a category that is referred to as bit-mapped, or screen fonts, in which each pixel of a glyph is defined. Each of these technologies has a different set of rules for processing font data to satisfy a particular request. For instance, the characters of a bit-mapped font may be stored on the computer for a particular point size, e.g., 12 point. If the user requests the characters to be displayed at a different size, the pixel data must be processed to rescale the images of the characters. This processing is carried out in a font scaler 48a. In general, the font scaler operates in accordance with a set of rules for interpreting and processing the stored font data so as to satisfy specific requests from the font server 44. Each different type of font technology has an associated scaler for processing the data of fonts which conform to that technology. Thus, in the example of FIG. 3, a TrueType scaler 48b and a Type 1 scaler 48c are contained within the font subsystem.

In operation, the application program 34 issues a request for a particular font object. The font object provides an identification of a glyph family, e.g. a particular character such as "lowercase a", as well as its desired line weight and stress. The request from the application program also identifies any style variations to be applied to the character, such as italic, bold, underline, superscript, and the like. Upon receiving the font object, the font server 44 determines the font technology with which that object is associated, and passes the request on to the appropriate scaler 48. The scaler retrieves the necessary data from the suitcase 46 associated with the identified font, and processes it to meet the parameters specified in the request. The scaler then returns a glyph image to the font server 44, which is provided to the imaging system 38 and stored in the glyph cache 40.

Figure 4:
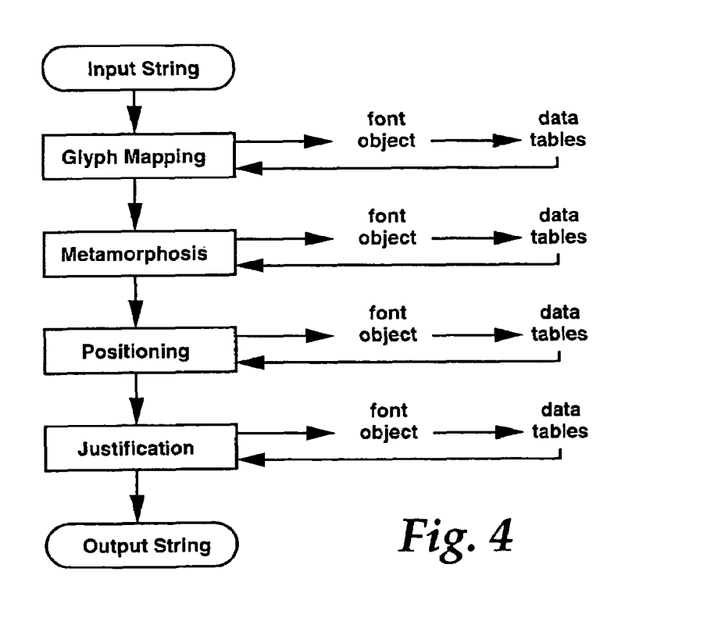
FIG. 4 is a flow chart of the general procedures that are carried out in a line layout processor.

As the individual glyph images are received from the font subsystem 42, they are displayed as a line of characters by the imaging system 38. The imaging system may include additional technology for processing and manipulating the glyph images before they are displayed. For example, the imaging system may include a line layout processor, which adjusts the positions of individual glyphs relative to one another, and performs further modifications of the glyphs, to lay out a complete line of characters. An example of the general procedures that are carried out in the line layout processor is illustrated in FIG. 4. The line layout processor receives an input string consisting of a sequence of character codes and associated style information. As a first step, the character codes are mapped to glyph codes specific to the font. This mapping is performed in accordance with a data table stored in the font suitcase. The layout processor examines the glyph codes relative to certain rules and conditions, and selectively performs three major types of operations on the glyphs. These three operations constitute metamorphosis, positioning and justification. After these three processes have been applied to the glyphs in a line, an output string is produced which contains bit-mapped information for drawing the appropriate glyph images.

Metamorphosis encompasses a variety of procedures via which the initial set of glyphs identified by the input string are transformed into a different set of glyphs. Some of the transformations can be independent of the context within which they appear. For instance, when a glyph for the letter 'f' is followed by a glyph for the letter 'i' in a word, these two glyphs can be transformed into an 'fi' ligature, in which the two separate glyphs appear to be joined. Another example of such transformation is the automatic conversion of numbers into Roman numeral form. Other types of transformations are dependent upon the context in which they appear, and are usually determined by rules pertaining to a specific language. For instance, two letters may be transposed if they appear at the end of a word, rather than in the middle of a word.

After the identities of glyphs have been changed in the metamorphosis step, the line layout processor determines whether the positions of any of the glyphs should be adjusted, relative to one another. For instance, in the case of the word 'To', it may be desirable to shift the position of the glyph for the letter 'o' to the left, to avoid the appearance of a large space between the two letters. Similarly, it may be appropriate to adjust the vertical position of a hyphen, so that it is centered with respect to the two characters between which it appears.

After the general positioning of the individual glyphs takes place, the final process in the layout of the line is the justification of the entire line. In this process, the intercharacter spacing is adjusted, as appropriate, to provide the desired type of justification. In some alphabets, the justification may be provided by extending the letters themselves, rather than by adjusting the spacing. For instance, the Arabic alphabet uses extension bars, known as kashidas, to increase the geometric length of a word, while keeping all characters connected to one another. The justification process determines whether the use of kashidas and/or intercharacter spacing adjustment is required, and revises the glyph images accordingly.

Each of these major processes relies upon the data contained in one or more font tables to carry out the appropriate adjustments to a sequence of glyphs. For instance, during the metamorphosis procedure, the layout processor may refer to a ligature table and a metamorphosis table to identify the appropriate glyph identity changes to be carried out. In operation, the layout processor employs the font objects associated with the glyphs in the input string to retrieve the tables corresponding to those fonts. These tables are then examined as part of the procedure to determine the types of glyph identity changes that need to be made. Similarly, during the positioning procedure, the layout processor may refer to tables that contain data relating to kerning, baseline alignment, tracking and glyph properties. During the justification procedure, the layout processor employs a justification table. In each case, the font objects associated with the glyphs in a line are employed to select the appropriate tables from the various font suitcases 46.

After the glyphs in a line have been appropriately processed through the layout procedure, an output string of pixel values is produced, to control the display of the line of characters on the display device 28. For more detailed information regarding the line layout procedures, and the manner in which the font data tables are employed in such procedures, reference is made to the aforementioned U.S. Pat. No. 5,416,898.

Turning now to the specifics of the present invention, it may be the case that one or more of the fonts that are employed in a document does not include all of the tables that are necessary for the layout processor to perform all of its operations on the glyphs. This may be particularly true in the case of older fonts that were created before the capabilities of the layout processor were developed. In addition to the layout processor, other operations that occur within the computer may require information from data tables in the font. For instance, to display a menu of font styles, an application program may need to access a table of names. If the table is not present, the menu cannot be displayed. In accordance with the present invention, tables that are required to process fonts, for example within the layout processor or in any other component of a font handling system, are automatically created when they are missing from the original font definition.

In operation, the automatic synthesis of a font table is carried out when the layout processor, or another software component which utilizes font data tables, issues a call for a specific table for a particular font, and the font subsystem determines that the data table is not present in that font. When this situation occurs, the automatic synthesis of the data table can be carried out in one of two ways. In one approach, all of the tables that are missing from the identified font can be synthesized and stored in the computer's random access memory 16 for the remainder of the session during which the font is utilized. This mode of operation may be advantageous when the same information about a font is used to synthesize a number of different tables. In this approach, it is only necessary to retrieve and analyze this information once. However, by synthesizing all missing tables at once, there may be an unnecessary expenditure of processing time, if all of the tables are not subsequently utilized during that session.

In another embodiment of the invention, the tables are individually synthesized as needed. Thus, for example, if the line layout processor issues a call for a metamorphosis table, and the font server determines that such a table is not present in the identified font, the metamorphosis table is synthesized at that time and used in the metamorphosis procedure. Subsequently, as additional tables are called for, they are individually synthesized as needed. With such an approach, the processing effort to synthesize the tables is limited to that which is actually required at the time.

In another aspect of the invention, the determination whether a table should be synthesized can be controlled on the basis of the table itself. Some data tables can be considered to be required as part of the basic implementation of the font. One example of such a data table is the table which maps character codes to glyph codes. Without such a table, many types of font operations cannot be carried out. Other types of data tables can be categorized as optional. For instance, some of the data tables employed by the layout processor may be language dependent, such as a table which defines kashidas that are used in Arabic text but which are not employed with Roman characters. The determination whether such a table is, in fact, needed can be best made by the process which calls for the table.

In one embodiment of the invention, when a call is made for a required table, the font subsystem operates in a first mode where it automatically issues a command to synthesize the table, if it is not already present. In this case, the absence of the data table from the original font is transparent to the calling process. If the requested table is an optional table, however, the font subsystem does not automatically initiate the synthesis of the table. Rather, it operates in a second mode where it returns a message to the calling process, e.g. the layout processor, which indicates that the table is not available. At this point, the processor can determine whether the table is really needed. If so, it issues an explicit call to the font subsystem to create the table. In response to this call, the font subsystem then initiates the synthesis of the table.

Figure 5:
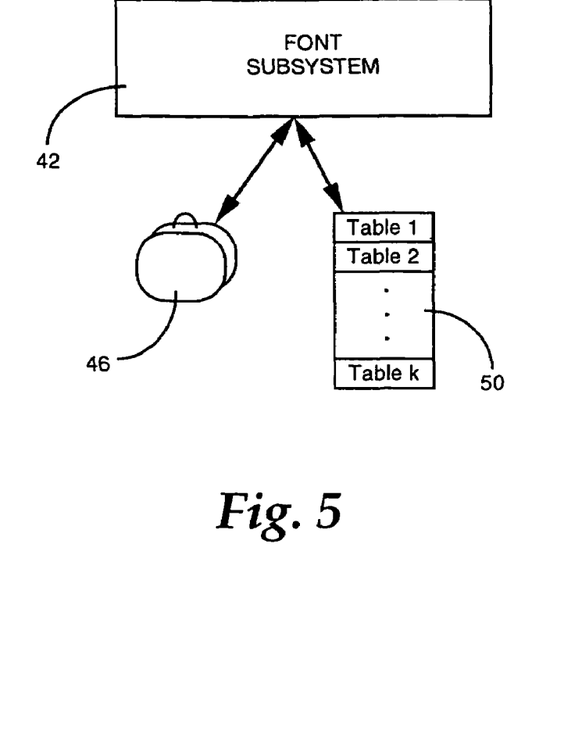
FIG. 5 is a schematic illustration of the relationship of a font suitcase and an annex file.

As a further feature of the invention, once a table is synthesized for a particular font, the table is stored in a persistent manner, so that its data is available for all subsequent sessions which employ that font. Preferably, the synthesized table is not stored as part of the original font definition, i.e. it is not contained within the suitcase 46 for the font. Rather, as depicted in FIG. 5, the table is stored in a separate annex 50 that is associated with the font. This annex is a file which contains additional information about the font, namely synthesized tables and the like, but does not affect the original font definition stored in the suitcase. By storing the synthesized tables in a separate annex, font protection techniques which verify the integrity of the original font data in the suitcase 46 will continue to operate in the intended manner. For example, some font protection techniques rely upon a checksum of data in the font, and/or a digital signature of the font. These techniques need not consider, nor even be aware of, the annex file when computing the checksums or digital signatures. Hence, the values which they compute will continue to indicate that the original font data is unmodified.

The table data can be stored in the annex in one of two ways. If all tables are synthesized at once, it may be preferable to store the tables in the same type of data structure as the original font data. For instance, this structure may include a directory, and the tables are stored with offsets and lengths that are specified in the directory. In this manner, data in the annex file can be indexed in the same manner as data in the original font file.

If the tables are synthesized one at a time, rather than all at once, it may be preferable to store each table individually, e.g. as a linked list of tables that form the annex file. In this situation, the overhead of a directory can be eliminated.

Figure 6:
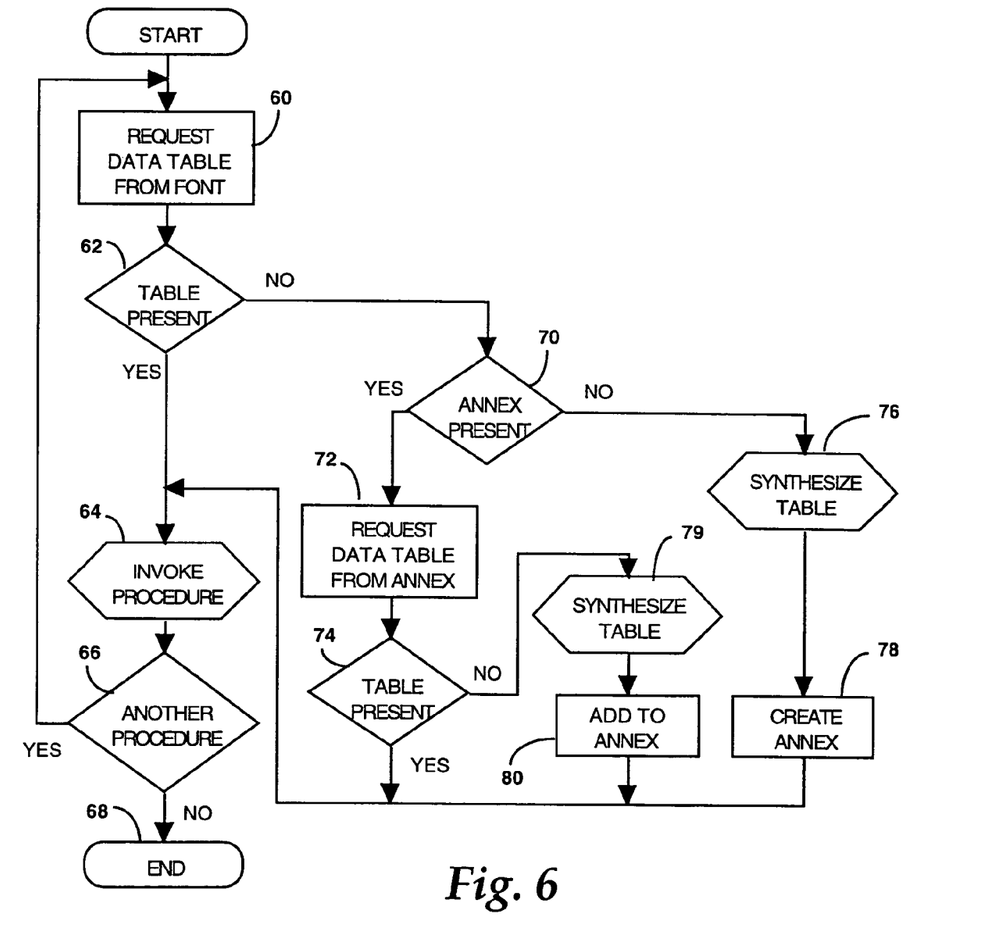
FIG. 6 is a flow chart of the general procedure for obtaining and synthesizing font data tables.

The general operation of the line layout processor and font subsystem, in accordance with the present invention, is depicted in the flowchart of FIG. 6. When a particular line layout procedure is to be performed, e.g. metamorphosis, the layout processor issues a call at step 60 for the font tables that are pertinent to that procedure. At step 62, a determination is made by the font subsystem whether the requested tables are present. If so, they are returned to the layout processor and the appropriate procedure is carried out at step 64. The processor then goes to the next procedure to be performed, at step 66, or terminates at step 68 if no further procedures are to be carried out.

If the font subsystem determines at step 62 that the font suitcase does not contain the requested table, it then looks to see whether an annex is associated with the font, at step 70. If so, the font subsystem attempts to obtain the table from the annex at step 72. If the font subsystem obtains the table, at step 74, it returns it to the processor, which proceeds in the normal fashion, at step 64, to carry out the current procedure.

If there is no annex associated with the font, as determined at step 70, then the requested data table is not present. Therefore, the table synthesis routine is initiated at step 76. As described previously, this routine can be automatically called by the font subsystem if the data table is classified as being required, or in response to a call from another process if the table is an optional one. Once the appropriate table has been synthesized, the annex is created at step 78 and the table is stored in it, and then used to complete the procedure at step 64. If the annex was already present, but the requested data table was not found at step 74, the table is synthesized at step 79 and then added to the annex at step 80, where it is used to carry out the current procedure at step 64.

Figure 7:
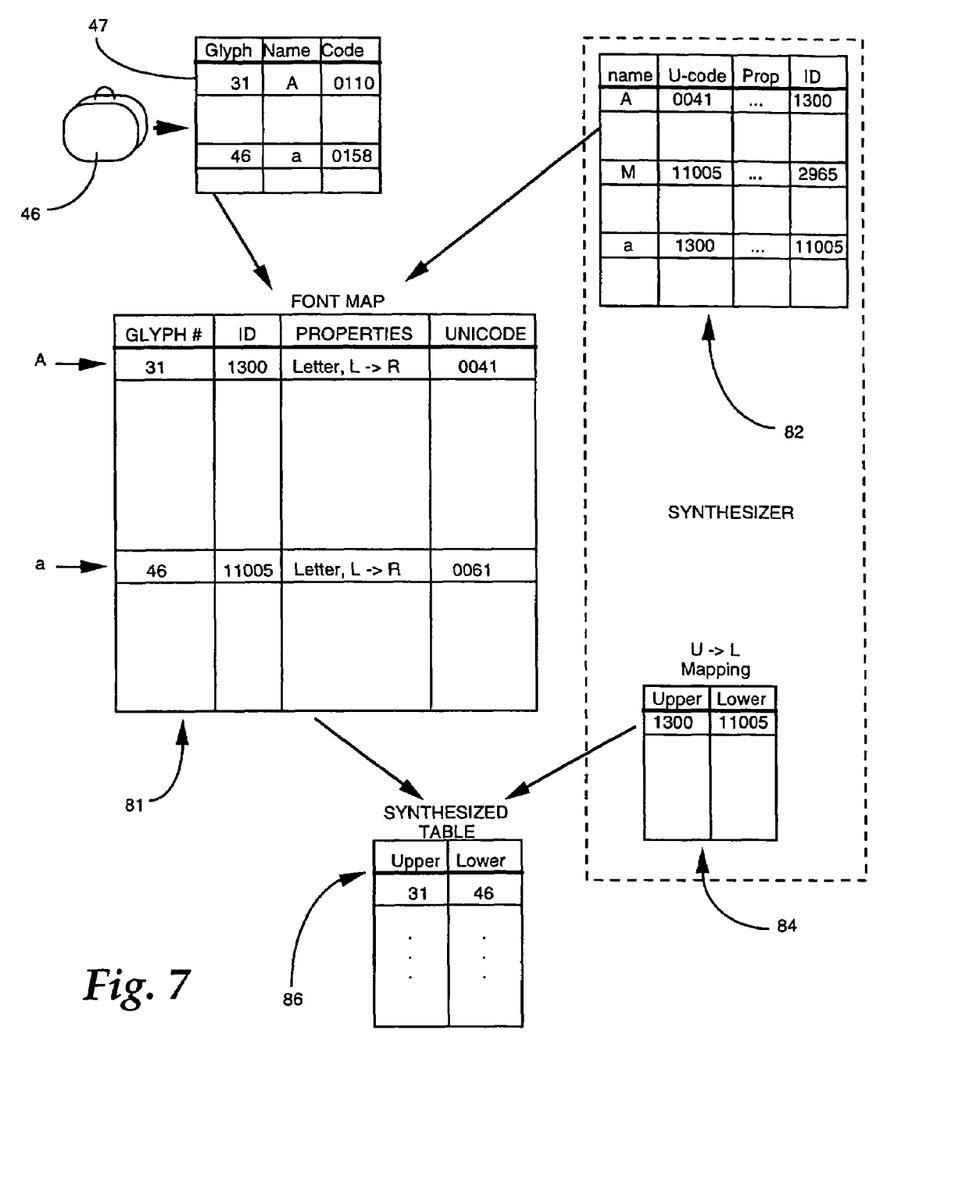
FIG. 7 is a schematic illustration of one example of the synthesis of a data table.

The process that is carried out at steps 76 and 80 to synthesize certain types of data tables is schematically depicted in FIG. 7. In general, the process is carried out by a synthesizer which contains tables of information that are generic to all fonts for which synthesis can be carried out. The information in these tables is combined with font-specific information to synthesize the necessary data table. The synthesizer also contains a program to assemble data from various sources into the appropriate table.

The first step of the process is to build a font map 81. The map is constructed from the repertoire of data that is available for each of the glyphs in a specific font for which a data table is to be synthesized. In essence, the glyph repertoire consists of all of the information that is contained within a font, e.g. in the font suitcase, about individual glyphs. In a TrueType font, for example, the pertinent data might consist of a 'cmap' table which identifies the mappings between character encodings and glyph indices, a 'post' table which provides the PostScript names for all of the glyphs in a font, as well as other PostScript data. In some cases, additional information that is known about a font may be available, even though it is not found in the font suitcase. This data can be stored in a table that is contained within the synthesizer.

The font map which is constructed from the glyph repertoire provides certain characterizing information about each glyph in the font. In the example of FIG. 7, the data for each glyph includes a glyph number, an identification value, properties, and a unicode value. The glyph number is specific to the particular font, and can be obtained from data tables in the font suitcase 46. For instance, FIG. 7 illustrates a table 47 which maps each glyph to an associated name and character encoding. In contrast, the identification value is universal to all fonts. For instance, glyph 31 in font 1 may have the same appearance as glyph 42 in font 2. These two glyphs are represented by the same universal identification number, e.g. 1300 in the example of FIG. 7. These universal identification numbers are stored in a table 82, which forms part of the synthesizer. In the illustrated example, the name of a glyph in the font-specific table 47 is used to locate its universal ID in the table 82.

The properties value indicates characteristics of the glyph. For instance, the properties associated with the glyph 'A' are that it is a letter, and it has left-to-right directionality. The unicode value is a character encoding value which is independent of the computer platform. These entries are obtained from the table 82 for storage in the font map 81.

In the example of FIG. 7, the synthesizer is building a data table which contains a mapping from uppercase to lowercase letters. This process utilizes a mapping table 84 in the synthesizer, which defines relationships between characters. The mapping table 84 is based upon universal identification values, whereas the synthesized table must identify the glyph values for the specific font of interest in order to be useable by the layout processor. For the first entry in the font map, associated with the uppercase character 'A', the table 84 indicates that the glyph with the identification value 1300 maps to glyph ID 11005. The synthesizer then looks in the font map for any glyph having the identification value 11005. In the example of FIG. 7, glyph 46, corresponding to the lowercase letter 'a', meets this criterion. Accordingly, an entry is made in the table 86 being created, which indicates that glyph 31 maps to glyph 46. A corresponding entry is created for each glyph in the font map whose identification value has an associated uppercase-to-lowercase mapping in the synthesizer table 84. Once all of these mappings have been identified and entered in the synthesized data table 86, the table is stored in the annex.

In a similar manner, other types of metamorphosis tables can be created. For instance, a ligature table which maps a sequence of consecutive glyphs to a single ligature glyph can be created using the same procedure. These mappings are stored in another mapping table which forms part of the synthesizer. The data in the table comprises font-specific information that is derived from font-independent data stored in the synthesizer.

Figure 8:
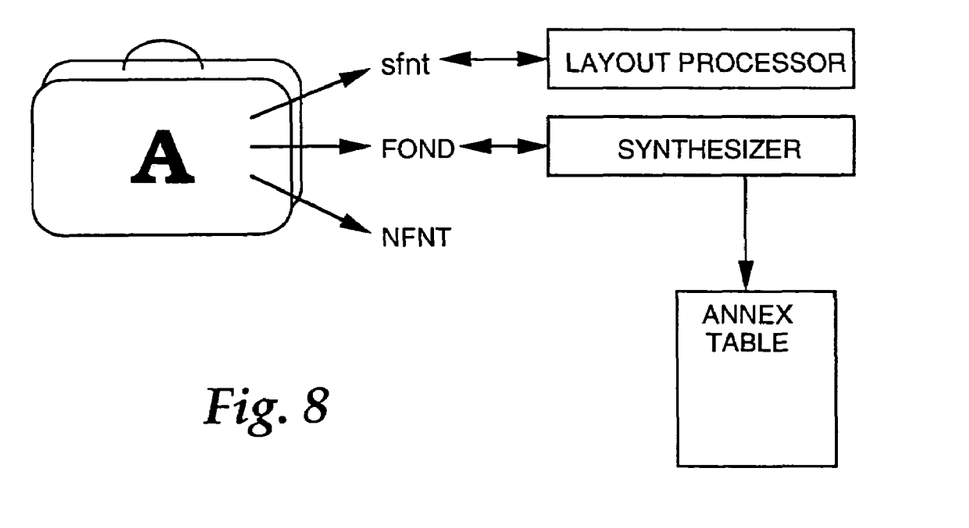
FIG. 8 is a schematic illustration of another example of the synthesis of a data table.

The synthesis of tables such as uppercase-to-lowercase and ligature tables, as described in the foregoing example, is based upon data which is internally stored in the synthesizer. The synthesis of other types of tables can be carried out on the basis of information which is obtained externally of the synthesizer. For instance, a TrueType font contains three primary types of resources, known as sfnt, NFNT and FOND, as depicted in FIG. 8. The sfnt resource forms the font definition that is used by the layout processor. If a required data table is not present in the sfnt resource, the layout processor must obtain it from the annex file.

In some cases, the information necessary to perform a layout operation may be present in one of the other resources of the suitcase. One example relates to kerning data. It may be the case that the sfnt resource does not contain the required kerning table, in which case the layout processor is not able to utilize data directly from the suitcase to perform an operation. However, kerning data may be present in the FOND resource, although not in a format which can be employed by the layout processor. In this case, the synthesizer can use this data in the FOND resource to build the necessary table. In operation, if a call is made to synthesize a kerning table, the synthesizer examines the FOND resource, as well as any other resource in the font suitcase, to determine whether kerning data is present. If so, the data is retrieved and stored in a data structure having the format that can be read by the layout processor. This data structure is stored in the annex file as the data table, where it can be used by the layout processor. In this embodiment, therefore, the data table is not computed from a variety of different data sources, as in the example of FIG. 7. Rather, the synthesis of the data table involves the translation, or reformatting, of data that already exists in the font file.

The building of a new table from data which exists in the font can be performed for a variety of purposes. For instance, the data needed to perform a particular operation may exist in a number of different tables. To optimize the procedure, a new table can be constructed in which the data is collected into a single data structure, where it can be retrieved more efficiently by the process. As a further example, it may be desirable to construct a new table to correct an error in the original data, e.g. eliminate references to corrupted data.

From the foregoing, it can be seen that the present invention provides a mechanism via which data tables pertaining to characteristics of fonts can be automatically synthesized when they are missing from an original font definition, to thereby enable newly developed font processing technologies to be employed in connection with fonts that were created before such technologies became available. By storing the synthesized data tables in an annex associated with the font, the original font definition is not modified. As a result, font protection mechanisms continue to operate as designed. Furthermore, the annex file remains persistent across successive boots of the computer, so that the effort required to synthesize a table needs to be expended only one time per font.

It will be appreciated by those of ordinary skill in the art that the present invention can be embodied in other forms without departing from the spirit or essential characteristics thereof. For instance, although the synthesis of data tables has been specifically described in connection with the operation of the layout processor, such a procedure can be employed by any component of a font system which makes use of font data tables. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for automatically synthesizing a data table that contains information about glyphs in a font, comprising the steps of:

in response to a request from an imaging system in a computer for a table in a font, determining, in the computer, whether the font contains the requested table;

if the font is determined not to contain the requested table, building a font map in memory of the computer that contains information about individual glyphs in the font;

determining, in the computer, relationships between items of information in the font map; and constructing, in memory of the computer, a table which identifies said relationships.

2. The method of claim 1 wherein some of the information in said font map is specific to the font, and other information is generic to multiple fonts.

3. The method of claim 2 wherein the synthesized table contains font-specific information that is determined with reference to generic information.

4. The method of claim 1 further including the step of storing the synthesized data table in memory of the computer as a persistent annex file that is associated with, but separate from, the font.

5. The method of claim 1 further including the steps of:
determining whether said data table is of a first type or a second type when the table is determined not to be present in the font; and
directly initiating said constructing step if said table is of said first type, or providing an indication that said table is not present in the font if said table is of said second type, and initiating said constructing step upon receipt of a request that is responsive to said indication.

6. A computer-readable medium containing a program which executed executes the steps of:
in response to a request for a table in a font, determining whether the font contains the requested table;
if the font is determined not to contain the requested table, building a font map that contains information about individual glyphs in the font;
determining relationships between items of information in the font map; and
constructing a table which identifies said relationships.

7. The computer-readable medium of claim 6, wherein some of the information is said font map is specific to the font, and other information is generic to multiple fonts.

8. The computer-readable medium of claim 7, wherein the synthesized table contains font-specific information that is determined with reference to generic information.

9. The computer-readable medium of claim 6, wherein said program executes the further step of storing the table in an annex file separate from said font file.

10. The computer-readable medium of claim 6, wherein said program further executes the further step steps of:
determining whether said table is of a first type or a second type when the table is determined not to be present in the font file; and
automatically initiating said constructing step if said table is of said first type, or providing an indication that said table is not present in the font file if said table is of said second type, and initiating said constructing step upon receipt of a request that is responsive to said notification.

* * * * *

UNITED STATES PATENT AND TRADEMARK OFFICE
CERTIFICATE OF CORRECTION

PATENT NO.         : 7,692,656 B2
APPLICATION NO.    : 11/455885
DATED              : April 6, 2010
INVENTOR(S)        : David G. Opstad et al.

Page 1 of 1

It is certified that error appears in the above-identified patent and that said Letters Patent is hereby corrected as shown below:

In column 1, line 5, delete "May 7,1999," and insert -- May 7, 1999, --, therefor.

In column 11, line 25, in Claim 6, after "which" delete "executed".

In column 12, line 17, in Claim 10, after "the" delete "further step".

Signed and Sealed this
First Day of November, 2011

David J. Kappos
*Director of the United States Patent and Trademark Office*